United States Patent
Gopp et al.

(10) Patent No.: US 6,715,476 B2
(45) Date of Patent: Apr. 6, 2004

(54) SYSTEM AND METHOD FOR EXHAUST GAS RECIRCULATION CONTROL

(75) Inventors: Alexander Yuri Gopp, Ann Arbor, MI (US); John Ottavio Michelini, Sterling Heights, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 109 days.

(21) Appl. No.: 10/063,332

(22) Filed: Apr. 12, 2002

(65) Prior Publication Data

US 2003/0192518 A1 Oct. 16, 2003

(51) Int. Cl.⁷ .............................................. F02B 47/08
(52) U.S. Cl. ................................. 123/568.22; 701/108
(58) Field of Search .................... 123/568.22, 568.21, 123/568.11; 701/108; 60/605.29

(56) References Cited

U.S. PATENT DOCUMENTS

| | | |
|---|---|---|
| 4,164,206 A | 8/1979 | Toelle |
| 4,171,691 A * | 10/1979 | Nohira et al. ............ 123/568.22 |
| 4,173,205 A | 11/1979 | Toelle |
| 5,029,570 A | 7/1991 | Stoltman et al. |
| 5,273,019 A | 12/1993 | Matthews et al. |
| 5,374,224 A | 12/1994 | Huffmaster et al. |
| 5,515,833 A * | 5/1996 | Cullen et al. ............ 123/568.22 |
| 5,619,974 A | 4/1997 | Rodefeld et al. |
| 5,832,896 A | 11/1998 | Phipps |
| 5,889,203 A | 3/1999 | Wild et al. |
| 5,988,149 A | 11/1999 | Gates |
| 6,014,961 A | 1/2000 | Gates |
| 6,098,602 A | 8/2000 | Martin et al. |
| 6,109,249 A | 8/2000 | Wild et al. |

* cited by examiner

Primary Examiner—Mahmoud Gimie
(74) Attorney, Agent, or Firm—Brooks & Kushman; Carlos Hanze

(57) ABSTRACT

A system and method for controlling a multi-cylinder internal combustion engine having at least one automatically controllable airflow actuator and an exhaust gas recirculation (EGR) system including an EGR valve include determining a desired manifold pressure based at least in part on position of the automatically controllable airflow actuator and controlling the EGR valve such that a measured manifold pressure approaches the desired manifold pressure. In one embodiment, the automatically controllable airflow actuators include a charge motion control valve and a variable cam timing device. In other embodiments, the automatically controllable airflow actuators may include variable valve lift devices, variable valve timing devices, or any other device that affects the residual exhaust gases within the cylinders.

19 Claims, 3 Drawing Sheets

SYSTEM AND METHOD FOR EXHAUST GAS RECIRCULATION CONTROL

BACKGROUND OF INVENTION

1. Field of the Invention

The present invention relates to a system and method for controlling exhaust gas recirculation in a multi-cylinder internal combustion engine.

2. Background Art

The use of exhaust gas recirculation (EGR) to reduce feedgas emissions of nitrogen oxides is well known. The accuracy of various EGR control systems may depend upon proper operation and control of an EGR valve, which may be a proportional or on/off type valve. Various EGR control systems, including both open-loop and closed-loop control systems, have been developed to more accurately control the EGR valve in an attempt to more accurately control EGR flow. Modern internal combustion engine technology employs a wide variety of inlet and outlet airflow control devices to improve engine efficiency and reduce emissions. However, this technology may affect determination of a desired EGR flow and/or actual EGR flow for a particular EGR valve position. For example, electronically controlled throttle valves, charge motion control valves, variable valve timing (VVT), variable cam timing (VCT), and/or variable valve lift control, or any other device which affects the residual exhaust gas within the cylinders may all have an impact on EGR flow control.

SUMMARY OF INVENTION

A system and method for controlling a multi-cylinder internal combustion engine having at least one automatically controllable airflow actuator and an exhaust gas recirculation (EGR) system including an EGR valve include determining a desired manifold pressure based at least in part on position of the automatically controllable airflow actuator and controlling the EGR valve such that a measured manifold pressure approaches the desired manifold pressure. In one embodiment, the automatically controllable airflow actuators include a charge motion control valve and a variable cam timing device. In other embodiments, the automatically controllable airflow actuators may include variable valve lift devices, variable valve timing devices, or any other device that affects the residual exhaust gases within the cylinders.

The present invention includes a number of advantages. For example, the present invention provides a feedback control system using manifold pressure as a feedback signal. The feedback control automatically corrects all uncertainties introduced by the EGR control valve and any other airflow actuators which affect residual exhaust gases in the cylinders. In addition, the use of a MAP sensor for feedback control provides a higher accuracy than many other engine sensors to further improve the accuracy of delivered exhaust gas.

The above advantage and other advantages, objects, and features of the present invention will be readily apparent from the following detailed description of the preferred embodiments when taken in connection with the accompanying drawings.

DETAILED DESCRIPTION

Figure 1:
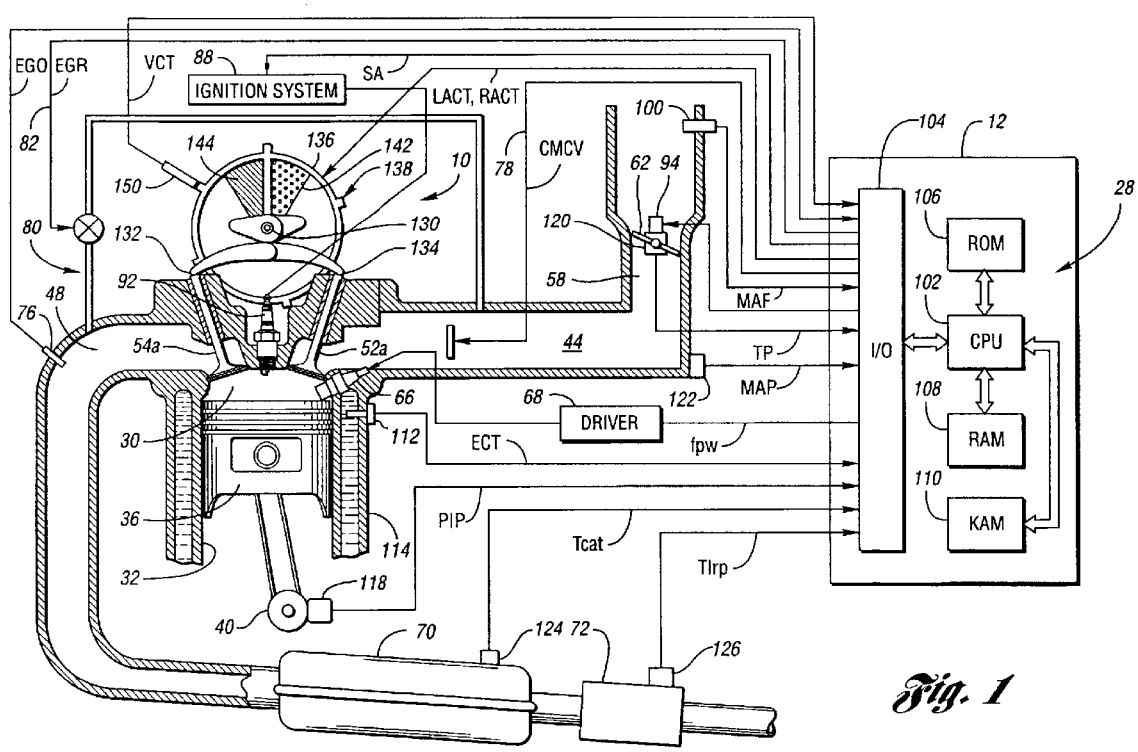
FIG. 1 is a block diagram illustrating operation of one embodiment for a system or method for controlling exhaust gas recirculation according to the present invention.

A block diagram illustrating an exhaust gas recirculation system for a representative internal combustion engine with an EGR control according to one embodiment of the present invention is shown in FIG. 1. Direct injection spark ignited internal combustion engine 10, comprising a plurality of combustion chambers, is controlled by electronic engine controller 12. Combustion chamber 30 of engine 10 includes combustion chamber walls 32 with piston 36 positioned therein and connected to crankshaft 40. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. While FIG. 1 illustrates a direct injection spark ignition internal combustion engine, those of ordinary skill in the art will appreciate that the present invention applies to any engine technology which uses EGR.

Fuel is delivered to fuel injector 66 by a conventional high pressure fuel system (not shown) including a fuel tank, fuel pumps, and a fuel rail. Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

A charge motion control valve (CMCV) 78, intake manifold runner control (IMRC), or similar device may be provided to selectively control the incoming air or air/fuel charge. In the illustrated example, CMCV 78 is open/closed based on a command from controller 12 to selectively increase the charge velocity. CMCV 78 is preferably contained within the runner associated with each cylinder. When closed, CMCV 78 reduces the cross-sectional area of the intake runner by about seventy-five percent. The CMCVs 78 associated with each bank may be connected to respective actuators to provide independent or coordinated control depending upon the particular application. As will be appreciated by one of ordinary skill in the art, the position of CMCV 78, in addition to the position of throttle plate 62, will affect the intake manifold pressure and the residual gases within cylinder 30 after combustion.

Exhaust gas oxygen sensor 76 is shown coupled to exhaust manifold 48 upstream of catalytic converter 70. In this particular example, sensor 76 provides signal EGO to controller 12. Signal EGO is used during feedback air/fuel control in a conventional manner. An EGR circuit 80, which includes an EGR valve 82, is used to selectively supply a portion of exhaust gas from exhaust manifold 48 to intake manifold 44. EGR valve 82 is preferably in communication with, and controlled by, controller 12 via signal EGR. EGR valve 82 may be any of a number of on/off or proportional valves actuated electrically or pneumatically. In one preferred embodiment, EGR valve 82 is an electrically actuated proportional valve having a closed-loop position control as described in greater detail with reference to FIG. 2.

Conventional distributorless ignition system 88 provides ignition spark to combustion chamber 30 via spark plug 92 in response to spark advance signal SA from controller 12. A second catalyst 72 is shown positioned downstream of catalytic converter 70. Catalyst 72 may be used to absorbs $NO_X$ produced when engine 10 is operating lean of stoichiometry, for example. The absorbed $NO_X$ is subsequently reacted with HC and catalyzed during a $NO_X$ purge cycle when controller 12 causes engine 10 to operate in either a rich or a stoichiometric mode.

Controller 12 preferably includes computer-readable storage media for storing data representing instructions executable by a computer to control engine 12. Computer-readable storage media 28 may also include calibration information in addition to working variables, parameters, and the like. In one embodiment, computer-readable storage media include a random access memory (RAM) 106 in addition to various non-volatile memory such as read-only memory (ROM) 108, and keep-alive memory (KAM) 110. The computer-readable storage media communicate with a microprocessor 102 and input/output (I/O) circuitry 104 via a standard control/address bus. As will be appreciated by one of ordinary skill in the art, the computer-readable storage media may include various types of physical devices for temporary and/or persistent storage of data which includes solid state, magnetic, optical, and combination devices. For example, the computer readable storage media may be implemented using one or more physical devices such as DRAM, PROMS, EPROMS, EEPROMS, flash memory, and the like. Depending upon the particular application, the computer-readable storage media may also include floppy disks, CD ROM, and the like.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP may be used to provide an indication of engine load. MAP sensor 122 is also preferably used to provide a feedback signal for closed-loop EGR control according to the present invention as described in greater detail below.

In the example application of the present invention illustrated in FIG. 1, temperature Tcat of catalytic converter 70 and temperature Ttrp of second catalyst 72 are inferred from engine operation, such as disclosed in U.S. Pat. No. 5,414,994. In an alternate embodiment, temperature Tcat is provided by temperature sensor 124 and temperature Ttrp is provided by temperature sensor 126.

As also shown in FIG. 1, engine 10 includes a variable cam timing (VCT) device. Camshaft 130 of engine 10 is coupled to rocker arms 132 and 134 for actuating intake valves 52a, 52b (not shown) and exhaust valves 54a, 54b (not shown). Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144 in response to an appropriate signal LACT, RACT generated by controller 12. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Controller 12 sends control signals (LACT, RACT) to conventional solenoid valves (not shown) to control the flow of hydraulic fluid either into advance chamber 142, retard chamber 144, or neither.

Relative cam timing may be measured using the method described in U.S. Pat. No. 5,548,995, for example. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five toothed wheel, a measure of cam timing for a particular bank is received four times per revolution, with the extra signal used for cylinder identification.

Figure 2:
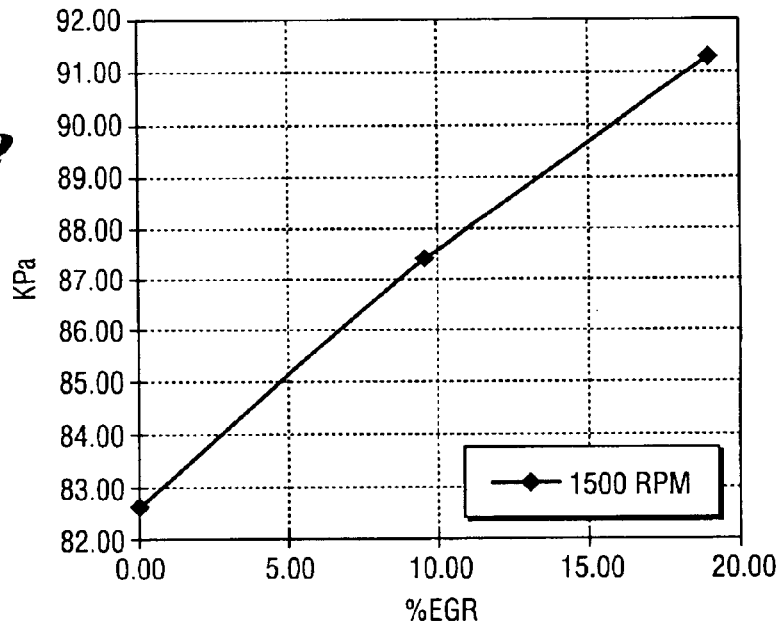
FIG. 2 is a graph illustrating the relationship between manifold pressure and EGR for use in one embodiment according to the present invention.

FIG. 2 provides a graph illustrating the relationship between manifold pressure and EGR for use in an EGR control system or method according to one embodiment of the present invention. The graph was generated using empirical data for a constant engine speed/throttle position corresponding to about 1500 RPM. As illustrated, manifold pressure varies from about 82.5 kPa to about 91.5 kPa as the EGR flow rate is varied from no EGR to about 20% EGR.

Figure 3:
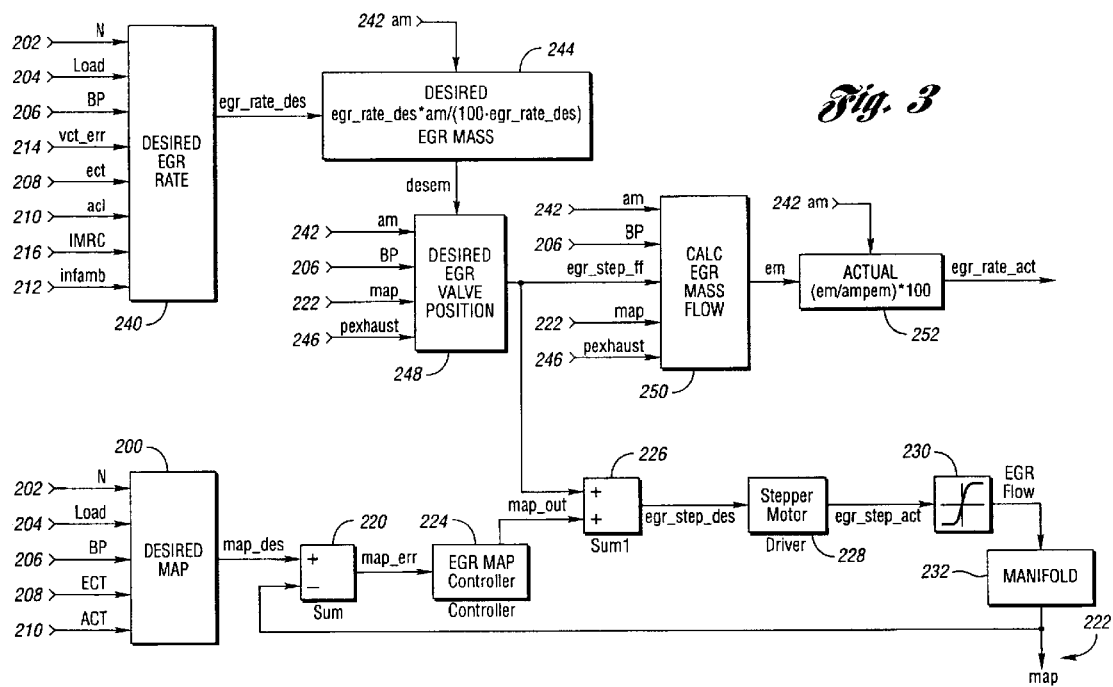
FIG. 3 is a block diagram illustrating a feedback controller for EGR using manifold pressure feedback according to one embodiment of the present invention.

FIG. 3 is a block diagram illustrating a feedback controller for EGR using manifold pressure feedback according to one embodiment of the present invention. As represented by those of ordinary skill in the art, the feedback controller may be implemented in software executed by the engine controller using one or more hardware actuators, sensors, and/or position controllers as described below. Alternatively, a dedicated physical controller using discrete components or a separate microprocessor or microcontroller could be used to provide the same functionality.

A desired manifold pressure is determined as represented by block 200. The desired manifold pressure is determined using one or more lookup tables based on various engine operating parameters that may include, but are not limited to, engine speed (N) 202, load 204, barometric pressure (BP) 206, engine coolant temperature (ECT) 208, and air charge temperature (ACT) 210, for example. The base MAP value and target EGR value (described below) are then modified or adjusted based on currently scheduled values for one or more of the engine operating parameters to produce a final value input to comparator 220.

Depending upon the particular automatically controllable airflow modulators available, block 200 may determine a desired MAP base value or final value in dependence upon variable valve timing, variable lift position (two-position or continuously variable), electronic throttle valve position, or any other airflow control device which may affect the amount of residual exhaust gas in the cylinders.

The final value for the desired manifold pressure is compared at 220 with the actual manifold pressure (MAP) 222. The actual manifold pressure is preferably measured using a corresponding sensor as described above. However, the value may be calculated, determined, or inferred based on various other engine operating parameters if desired. The resulting difference or error signal is provided to EGR MAP controller 224, which may be any known type of controller, such as a PID controller, for example. An EGR valve position command determined by EGR MAP controller 224 is combined at 226 with an EGR valve position determined by block 248 to determine a commanded EGR valve position (or duty cycle for on/off modulated valves) to reduce the error between the actual and desired MAP values. The EGR valve position command is supplied to stepper motor and driver 228, which provides appropriate signals to move the EGR valve 230 to the commanded position to provide the desired EGR flow and maintain the desired manifold pressure. In one embodiment, EGR valve position is changed using a stepper motor with an internal feedback control to provide closed-loop valve position control. In another embodiment, EGR valve position is changed using an open-loop drive, such as a DC motor or proportional electrical solenoid with the necessary feedback provided by the actual manifold pressure 222 in manifold 232.

As also illustrated in FIG. 3, a desired EGR rate is determined at 240 based on various engine and ambient operating conditions or parameters which may include engine speed 202, load 204, barometric pressure 206, engine coolant temperature 208, air charge temperature 210, and ambient temperature 212 (which may be measured or inferred). In addition, one or more automatically controllable airflow modulation devices may be used to determine the desired EGR flow rate represented by block 240. For the representative embodiment illustrated in FIG. 3, the desired EGR flow rate determination includes a plurality of variable cam timing (VCT) positions 214 as well as position (open, closed) of the charge motion control valves (CMCV) 216 (or intake manifold runner controls) used by block 240. Air mass 242 is used with the desired EGR rate to determine a desired EGR mass as represented by block 244. The desired EGR mass is used in conjunction with the air mass 242, barometric pressure 206, manifold pressure 22, and exhaust pressure 246 to determine a feed forward EGR valve position at 248, which is then combined with a EGR valve corrected position determined by EGR MAP controller 224 at 226 as described above.

As also illustrated in FIG. 3, the EGR valve position determined by block 248 is used along with air mass 242, barometric pressure 206, manifold pressure 222, and exhaust pressure 246 to determine or calculate an actual EGR mass flow as represented by block 250. The actual EGR mass flow is then converted to an actual EGR flow rate as represented by block 252.

It is clear from the control strategy illustrated in FIG. 3 that any changes in the EGR valve characteristics would be compensated by the feedback signal, thus accurately delivering the desired EGR flow. Likewise, any change in residual exhaust gas within the cylinders caused by operation or degradation of one or more automatically controllable airflow modulators is compensated for in the determination of desired MAP at block 200 or by the feedback controller 240.

Figure 4:
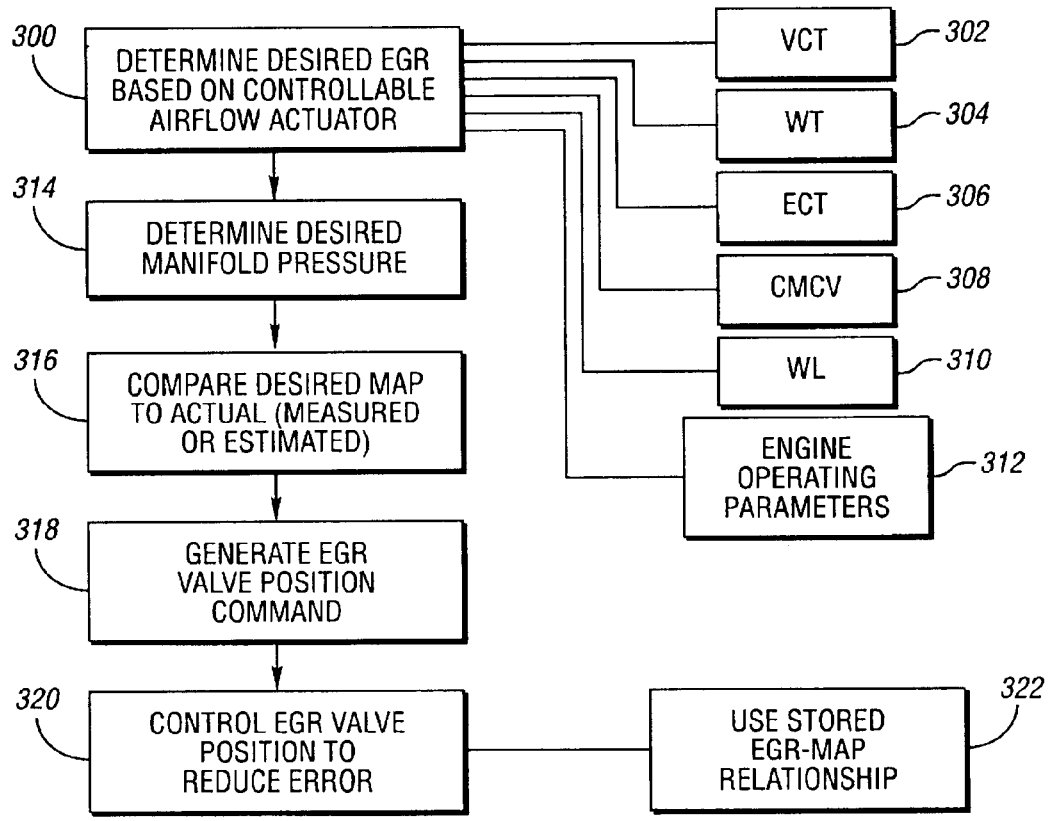
FIG. 4 is a flowchart illustrating operation of a system or method for EGR control according to one embodiment of the present invention.

The diagram of FIG. 4 generally represents control logic for one embodiment of a system or method according to the present invention. As will be appreciated by one of ordinary skill in the art, the diagram may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

Block 300 of FIG. 4 represents determination of a desired EGR flow based at least in part on position of an automatically controllable airflow actuator. The automatically controllable airflow actuator may include a variable cam timing device 302, variable valve timing device (such as an electromagnetic valve actuator) 304, an electronically controllable throttle valve 306, charge motion control valve or intake manifold runner control 308, variable valve lift device 310, or any other controllable airflow actuator which affects the residual exhaust within the engine cylinders. In addition, the desired EGR flow is preferably determined based at least in part on various engine operating parameters, represented generally by block 312. Engine operating parameters that may be used in the desired EGR flow determination include, but are not limited to, engine speed, engine load, barometric pressure, engine coolant temperature, and ambient temperature, for example.

A desired manifold pressure is determined as represented by block 314. The desired manifold pressure may be determined based on various engine and ambient operating conditions or parameters, such as engine speed, load, barometric pressure, engine coolant temperature, and air charge temperature, for example.

The desired MAP is compared to an actual value (which may be measured or estimated) to generate an error or correction value as represented by block 316, which is used to generate an EGR valve position command as represented by block 318. The EGR valve position command is modified or combined with an EGR valve position command based on the desired EGR flow rate and corresponding EGR flow mass. The combined or modified command is used to control the EGR valve to reduce the error between desired and actual manifold pressure as represented by block 320. The command may be based on an empirically generated relationship between EGR and MAP, which may be represented by a function, equation, or lookup table stored in the engine controller as represented by block 322.

As such, the present invention provides a feedback control system using manifold pressure as a feedback signal that automatically corrects all uncertainties introduced by the EGR control valve and any other airflow actuators which affect residual exhaust gases in the cylinders. In addition, the use of a MAP sensor for feedback control provides a higher accuracy than many other engine sensors to further improve the accuracy of delivered exhaust gas.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling a multi-cylinder internal combustion engine having at least one automatically controllable airflow actuator and an exhaust gas recirculation (EGR) system including an EGR valve, the method comprising:

determining a desired EGR rate based at least in part on position of the automatically controllable airflow actuator, the airflow actuator being downstream of a throttle valve;

determining a desired intake manifold pressure based on current engine operating conditions; and controlling the EGR valve such that actual intake manifold pressure approaches a desired intake manifold pressure.

2. The method of claim 1 wherein the step of determining a desired EGR rate comprises determining a desired EGR rate based on position of an automatically controllable airflow actuator operative to change intake velocity.

3. The method of claim 2 wherein the automatically controllable airflow actuator comprises a charge motion control valve.

4. The method of claim 1 wherein the step of determining a desired EGR rate comprises determining a desired EGR rate based on position of a variable cam timing device.

5. The method of claim 1 wherein the step of controlling comprises controlling the EGR valve based on the desired manifold pressure and a signal provided by a manifold pressure sensor indicative of actual intake manifold pressure such that an error between the desired intake manifold pressure and the actual intake manifold pressure is reduced.

6. The method of claim 1 wherein the desired intake manifold pressure is determined based at least in part on engine speed, engine load, barometric pressure, engine coolant temperature, and air charge temperature.

7. The method of claim 1 wherein the step of determining a desired EGR rate comprises determining a desired EGR rate based on position of a charge motion control valve and position of a variable cam timing device.

8. A method for controlling a multiple cylinder internal combustion engine having a plurality of charge motion control valves, each associated with one of the multiple cylinders, for selectively changing charge velocity, the engine also including an exhaust gas recirculation (EGR) system including an EGR valve, and a device for controlling timing of engine intake and/or exhaust valves, the method comprising:

determining a desired EGR flow based on position of the charge motion control valves and timing of the engine intake and/or exhaust valves;

determining a desired intake manifold pressure based on engine operating conditions;

determining an actual intake manifold pressure; and controlling the EGR valve to selectively modify the EGR flow such that the actual intake manifold pressure approaches the desired intake manifold pressure.

9. The method of claim 8 wherein the step of determining an actual intake manifold pressure comprises determining an actual intake manifold pressure based on a signal provided by a corresponding pressure sensor.

10. The method of claim 8 wherein the step of controlling the EGR valve comprises controlling the EGR valve based on a stored relationship between EGR flow and manifold pressure.

11. A computer readable storage medium having stored data representing instructions executable by a computer for controlling a multi-cylinder internal combustion engine having at least one automatically controllable airflow actuator and an exhaust gas recirculation (EGR) system including an EGR valve, the computer readable storage medium comprising:

instructions for determining a desired EGR flow based at least in part on position of the automatically controllable airflow actuator, the airflow actuator being downstream of a throttle valve; instructions for determining a desired intake manifold pressure based on engine operating conditions; and instructions for controlling the EGR valve such that actual intake manifold pressure approaches the desired intake manifold pressure.

12. The computer readable storage medium of claim 11 wherein the instructions for determining a desired EGR flow comprise instructions for determining a desired EGR flow based on position of an automatically controllable airflow actuator operative to change intake velocity.

13. The computer readable storage medium of claim 12 wherein the automatically controllable airflow actuator comprises a charge motion control valve.

14. The computer readable storage medium of claim 11 wherein the instructions for determining a desired EGR flow comprise instructions for determining a desired EGR flow based on position of a variable cam timing device.

15. The computer readable storage medium of claim 11 wherein the instructions for controlling comprise instructions for controlling the EGR valve based on the desired intake manifold pressure and a signal provided by a manifold pressure sensor indicative of actual intake manifold pressure such that an error between the desired intake manifold pressure and actual intake manifold pressure is reduced.

16. The computer readable storage medium of claim 11 wherein the instructions for determining a desired EGR flow determine the desired EGR flow based at least in part on engine speed, engine load, barometric pressure, engine cooling temperature, and ambient temperature.

17. The computer readable storage medium of claim 11 wherein the instructions for determining comprise instructions for determining a desired EGR flow based on position of a charge motion control valve and position of a variable cam timing device.

18. A multiple cylinder internal combustion engine comprising:

an intake manifold having a plurality of runners each corresponding to one of the multiple cylinders;

a manifold pressure sensor coupled to the intake manifold for providing a signal indicative of manifold pressure;

a plurality of charge motion control valves, each being associated with one of the plurality of runners, for selectively changing charge velocity;

a plurality of valves associated with each of the multiple cylinders, the valves being selectively controllable via a valve device to modify valve operation relative to a piston disposed within a corresponding cylinder;

an exhaust gas recirculation (EGR) system including an EGR valve, for selectively recirculating exhaust gas from an exhaust to the intake manifold; and a controller in communication with the EGR valve, the manifold pressure sensor, and the valve device, the controller determining a desired EGR flow based on position of the charge motion control valves and operation of the valve device, determining a desired intake manifold pressure based on engine operating conditions, determining an actual intake manifold pressure based on a signal from the manifold pressure sensor, and controlling the EGR valve to control exhaust gas flow based at least in part on a previously determined stored relationship between EGR and intake manifold pressure such that the actual intake manifold pressure approaches the desired intake manifold pressure.

19. The internal combustion engine of claim 18 wherein the valve device is a variable cam timing mechanism.

* * * * *